US012570542B2

(12) United States Patent
Rondas et al.

(10) Patent No.: US 12,570,542 B2
(45) Date of Patent: Mar. 10, 2026

(54) PROCESS FOR PREPARING A HIGH-PURITY NICKEL SULPHATE SOLUTION

(71) Applicant: Umicore, Brussels (BE)

(72) Inventors: Francis Rondas, Olen (BE); Jan Luyten, Olen (BE); Joris Roosen, Olen (BE); Wannes De Moor, Olen (BE); Maarten Schurmans, Olen (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 18/720,697

(22) PCT Filed: Dec. 20, 2022

(86) PCT No.: PCT/EP2022/086839
§ 371 (c)(1),
(2) Date: Jun. 17, 2024

(87) PCT Pub. No.: WO2023/118037
PCT Pub. Date: Jun. 29, 2023

(65) Prior Publication Data
US 2024/0417274 A1    Dec. 19, 2024

(30) Foreign Application Priority Data
Dec. 20, 2021    (EP) .................................... 21216032

(51) Int. Cl.
*C01G 53/10*        (2006.01)
*C01G 53/01*        (2025.01)
(52) U.S. Cl.
CPC ............. *C01G 53/10* (2013.01); *C01G 53/01* (2025.01)
(58) Field of Classification Search
None
See application file for complete search history.

(56) References Cited

U.S. PATENT DOCUMENTS 6,149,885  A     11/2000  Makino et al.
2008/0003154 A1   1/2008  O'Callaghan et al.
(Continued)

FOREIGN PATENT DOCUMENTS

CN      107162067 A      9/2017
CN      108622943 A     10/2018
(Continued)

OTHER PUBLICATIONS

Machine-generated English translation for JP 2017-025367 A (Year: 2017).*
(Continued)

*Primary Examiner* — Yun Qian
(74) *Attorney, Agent, or Firm* — Rimon P.C.; Allyn B. Elliott

(57)            ABSTRACT

The present invention provides a process for preparing a high-purity nickel sulphate solution, comprising the steps of: i. providing an aqueous feed solution comprising nickel, cobalt, calcium and magnesium: ii. extracting cobalt, calcium, and partly magnesium from said aqueous feed solution using a first solvent comprising a first alkylphosphorus-based acidic extractant, thereby obtaining an aqueous raffinate comprising nickel and magnesium: iii. extracting magnesium from said aqueous raffinate solution comprising nickel and magnesium using a second solvent comprising a second alkylphosphorus-based acidic extractant, thereby obtaining a high-purity aqueous nickel sulphate solution comprising nickel and magnesium: iv. stripping the first loaded solvent comprising cobalt, calcium and magnesium with an aqueous solution comprising a mineral acid.

20 Claims, 1 Drawing Sheet

(56)                    References Cited

U.S. PATENT DOCUMENTS

| | | |
|---|---|---|
| 2014/0322109 A1 | 10/2014 | Nakai et al. |
| 2021/0039011 A1 | 2/2021 | Ohara et al. |

FOREIGN PATENT DOCUMENTS

| | | | |
|---|---|---|---|
| EP | 1252345 B1 | | 6/2008 |
| EP | 2784166 B1 | | 5/2019 |
| EP | 3222735 B1 | | 7/2019 |
| EP | 3508453 A1 | | 7/2019 |
| EP | 3733884 A1 | | 11/2020 |
| JP | H10310437 A | | 11/1998 |
| JP | 2017-25367 A | * | 2/2017 |
| JP | 2021031729 A | | 3/2021 |
| JP | 2021031730 A | | 3/2021 |
| JP | 2021105206 A | | 7/2021 |

OTHER PUBLICATIONS

Machine-generated English translation for JP 2021-105206 A.*
ISA/EP; International Search Report and Written Opinion for International Patent Application No. PCT/EP2022/086839 dated Apr. 14, 2023, 7 pages.
ISA/EP; International Preliminary Report on Patentability for International Patent Application No. PCT/EP2022/086839 dated Apr. 2, 2024, 13 pages.
CIPO: Office Action for Canadian Patent Application No. 3,241,973, mailed Feb. 20, 2025, 4 pages.

* cited by examiner

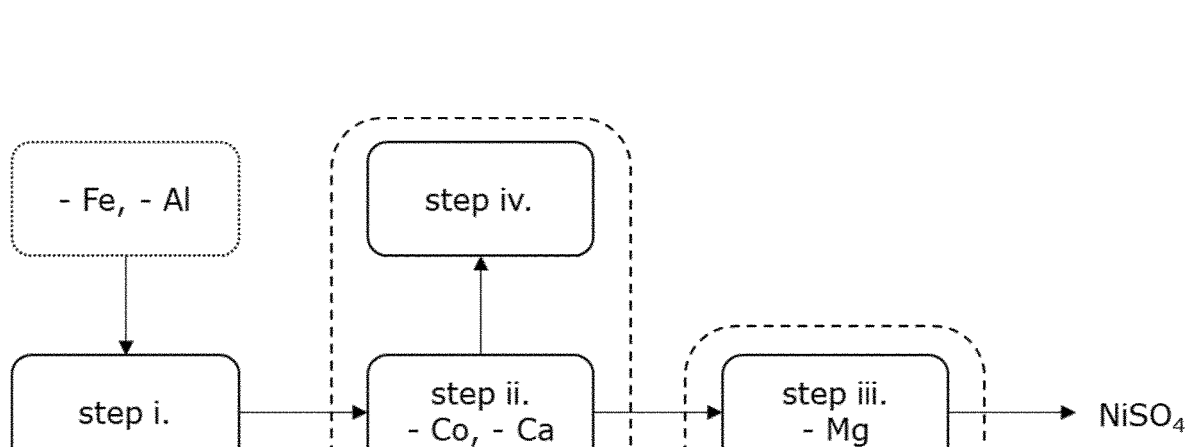

PROCESS FOR PREPARING A HIGH-PURITY NICKEL SULPHATE SOLUTION

CROSS REFERENCE TO RELATED APPLICATIONS

This application is a U.S. National Stage Application of International Patent Application No. PCT/EP2022/086839, filed on Dec. 20, 2022, which claims priority to European Patent Application No. 21216032.9, filed on Dec. 20, 2021.

TECHNICAL FIELD

The present invention relates to a novel method for producing an aqueous high-purity nickel sulphate solution, which can be further processed in a crystallization unit for producing high-purity nickel sulphate crystals, having a purity sufficient for use in the electroless deposition of nickel metal layers or the production of battery materials.

INTRODUCTION

The development of lithium-ion batteries, and specifically the use of nickel-manganese-cobalt and nickel-cobalt-aluminium cathode materials, has increased the demand for high-purity nickel sulphate, either as a solid or in solution. Indeed, impurities in the cathode materials strongly affect the performance of the batteries. As such, much effort has been devoted to producing high-purity nickel sulphate in an industrially viable process.

In this respect, US 2014/322109 provides a method for obtaining high-purity nickel sulphate having low levels of impurities, particularly low levels of magnesium and chloride, by introduction of a selective nickel sulphide precipitation step and redissolution of nickel sulphide to a nickel sulphate solution. This solution is further refined by solvent extraction to remove cobalt and magnesium impurities, adjusting the concentration of an acidic organic extractant and the pH or acid concentration at the time of treatment. The described processing strategy is cumbersome for concentrated nickel sulphate solutions since it requires an intermediate precipitation and redissolution of the nickel bulk, followed by solvent extraction to remove impurities cobalt and magnesium. Especially the nickel sulphide step is dangerous due to risk of hydrogen sulphide generation. Moreover, the solvent extraction is used only to remove cobalt and magnesium, although crude nickel raw materials typically contain many more impurities.

CN 107 162 067 relates to the field of recycling of solid waste and particularly discloses a method for recycling high-purity nickel sulphate from nickel-bearing waste batteries. The method comprises the steps of disassembling the nickel-bearing waste batteries into battery powder, dissolving the battery powder with an acid to obtain a metal-bearing solution, adding alkali metal sulphate, removing iron by an oxidative precipitation process, further removing impurities via a solvent extraction process to obtain magnesium-bearing nickel liquid, passing the magnesium-bearing nickel liquid through chelating-resin exchange columns to selectively adsorb nickel ions and leave a magnesium-rich solution flowing out for treatment, desorbing the nickel ions to obtain a nickel sulphate solution, evaporating the nickel sulphate solution, cooling, crystallizing, filtering, and finally drying to obtain the purified nickel sulphate product. By this lengthy and complex process, it is guaranteed that the recycled nickel sulphate is a high-purity product having a content up to 99.5% nickel and above, while the impurity, i.e. magnesium, content is less than 0.005%. However, three different solvent extraction units are proposed to remove copper, manganese and cobalt in separate steps. Apart from high investment costs, other impurities such as calcium and magnesium are not even pretended to be removed. Finally, nickel is recovered by adsorption onto a resin, requiring a fourth separation step and consumption of neutralization agent equivalent to the amount of adsorbed metal ions. Overall, the described process is considered not simple neither efficient.

EP 1 252 345 describes a process for extraction of cobalt from a cobalt-nickel solution with solvent loaded with nickel in order to obtain a purified nickel sulphate stream. It does however not learn how to remove impurities such as calcium and magnesium to very low levels in order to produce a purified nickel sulphate solution for electroless nickel or battery applications. It looks more to develop a solvent extraction process where the formation of insoluble ammonium/nickel sulphate double salts can be avoided.

EP 2 784 166 explains a process for producing a pure nickel sulphate solution in multiple process steps including a sulphurisation step, a redissolution step, a purification step by precipitation and a solvent extraction step. Especially the steps of sulphurisation and redissolution are expensive operations using a sulphurising agent and producing a sulphide intermediate of nickel, both products are toxic and could lead to generation of the highly toxic and gaseous hydrogen sulphide by contact and reaction with mineral acids. At the end, the purified nickel sulphate solution still contains 50 mg/L magnesium impurity which is too much for battery-grade nickel sulphate, and showing the lack of selectivity of the proposed process.

EP 3 733 884 describes a solvent extraction method that allows selective separation of magnesium from an acidic aqueous solution of sulphuric acid. The solvent extraction method includes bringing an acidic aqueous solution of sulphuric acid containing nickel, cobalt and magnesium in contact with an organic solvent to selectively extract magnesium to the organic solvent under very specific extraction conditions: either extract magnesium at rather low pH=1.5 to 2 with a concentrated solvent, i.e. containing 40 to 60% of an alkylphosphonic acid as extractant, or at higher pH=2.0 to 2.5 with a solvent containing a lower extractant concentration, i.e. 20 to 50% of an alkylphosphonic acid. This process only aims at removing magnesium and does not separate cobalt from the nickel solution. Remarkably, at most 46% of magnesium was removed from the nickel sulphate solution with already about 9% of nickel co-extracted under the same extraction conditions. Under such conditions a Mg/Ni separation factor of only 8 to 23 is obtained. When the extractant concentration in the used solvent is decreased below 40 vol. % a higher Mg/Ni separation factor up to 35 was obtained but with much lower removal of magnesium, i.e. lower than 28%.

EP 3 222 735 discloses a method of separating cobalt and magnesium from a nickel-bearing feed solution by liquid-liquid extraction, wherein the used organic solvent contains an alkylphosphinic acid as extracting agent. Both cobalt and magnesium are extracted together with some nickel. Nickel is first washed out from the loaded solvent with an acidic solution. Since the resulting nickel solution may contain some cobalt, it is sent back to the feed solution. Hereafter, magnesium is washed off from the solvent with an acidic solution. The obtained magnesium solution may contain some cobalt and is treated elsewhere. Cobalt is stripped from the solvent with a diluted aqueous solution of an acid to form a cobalt strip solution. Apart from cobalt and magnesium, the patent does not cope with the removal of other metal contaminants in a nickel sulphate solution such as calcium, zinc, cadmium, copper, manganese and iron. Neither does it elaborate on how to reach the desired pH for extraction of cobalt and magnesium from the nickel sulphate solution, given the release of acidic protons during extraction with an acidic extractant.

When EHEHPA, also known as PC88A, is used as an extractant, the extraction behaviour towards magnesium or calcium is similar with the behaviour towards nickel. JP 10-310437 discloses an example of separating nickel and cobalt by extracting cobalt together with other impurities such as calcium, copper, zinc, iron and magnesium by solvent extraction using PC88A as an extractant. When a solution containing nickel at a high concentration is submitted to solvent extraction, the problem occurs that the extraction efficiency of magnesium or calcium is decreased. The difficulty to remove magnesium from the nickel sulphate solution is mentioned. The final impurity output concentration in the purified nickel sulphate solution was still 3 to 26 mg/L cobalt, 2 to 7 mg/L calcium and 10 to 27 mg/L magnesium when containing 90 to 117 g/L nickel. The present invention solves the problem of insufficient calcium extraction by choosing operating conditions that favour calcium extraction but decrease magnesium extraction at the same time. This is offset by implementing an additional and separate solvent extraction for magnesium with a more favourable extracting agent and more favourable operating conditions.

In JP 2021/031729 the treatment of a crude nickel sulphate solution in one solvent-extraction process is shown where it is tried to remove all cobalt, magnesium and calcium from the nickel sulphate solution at once. The ratio of the amount of nickel loaded onto the solvent versus the concentration of cobalt in the nickel sulphate solution must be varied depending on the desired removal of impurities. However, from the examples it can be seen that it is not possible to remove all contaminants, as the purified nickel sulphate solution still contains 1 to 60 mg/L cobalt, 1 to 20 mg/L magnesium and 1 to 15 mg/L calcium. Also, the removal of magnesium seems marginal as the input concentration of magnesium in the crude nickel sulphate solution is very low, only 19 to 31 mg/L magnesium compared to a very high cobalt concentration of 8 to 12 g/L cobalt. This principle of co-extracting traces of magnesium, even incompletely, together with a large amount of cobalt is evidence that a large amount of nickel onto the solvent is necessarily used. Only it is pretended that magnesium can be better removed when increasing the amount of nickel onto the solvent loaded compared to the concentration of cobalt in the crude nickel sulphate solution. In JP 2021/031730, a similar patent, it is pretended that the amount of magnesium reported to the cobalt eluate, by co-extraction to the solvent, can be influenced by the chosen amount of nickel onto the solvent compared to the concentration of cobalt present in the crude nickel sulphate solution. Same examples as under JP 2021/031729. The purified nickel sulphate solution may still contain impurities as high as 1 to 60 mg/L cobalt, 1 to 20 mg/L magnesium and 1 to 15 mg/L calcium. And the reported amount of co-extracted magnesium to the cobalt eluate can obviously be varied.

In U.S. Pat. No. 6,149,885, a process is explained where impurities such as cobalt, calcium, copper and zinc are removed from a crude nickel sulphate solution by solvent extraction. A method is disclosed on how to load nickel onto the solvent that can afterwards be used for the removal of the impurities from the crude nickel sulphate solution. However, magnesium is only sparingly removed. In one example still 34 mg/L magnesium is left in the purified nickel sulphate solution, which is usually considered too impure for battery grade nickel sulphate quality. In another example even 354 ppm magnesium relative to 100% nickel is left in the purified nickel sulphate solution. The removal of other metals such as cadmium and manganese from the crude nickel sulphate solution is even not considered.

JP 2021/105206 discloses a solvent extraction method that can improve separability between nickel and cobalt in a nickel recovery stage. The presented solvent extraction method includes a nickel recovery stage in which an acidic extraction agent carrying nickel and cobalt and an acid are brought into contact, for back-extraction of nickel, to obtain a nickel recovery liquid. The extraction temperature in the nickel recovery stage is set to 47-60° C. Since the extraction temperature in the nickel recovery stage is set to 47° C. or higher, a distribution rate of cobalt to an organic solvent can be increased while keeping a low distribution rate of nickel to the organic solvent, so that the separability between nickel and cobalt can be improved. While JP 2021/105206 shows that the amount of magnesium and calcium in the nickel solution is affected by the extraction process to separate nickel from cobalt, it does not teach how to optimally reduce the amount of magnesium and calcium impurities in said nickel solution.

US 2008/0003154 describes a two-step solvent extraction circuit to remove impurity metals of zinc and cobalt selectively from a valuable metal of nickel. In order to selectively extract zinc there must be sufficient separation between zinc and cobalt in the Cyanex 272 system. Similarly for cobalt and nickel, the separation factor must be of sufficient magnitude to obtain a pure nickel product. The process for the solvent extraction of impurity metals is operated at a temperature between 80° C. and 100° C. Thereby, it is realized that cobalt can selectively be extracted from nickel; and that any iron, copper, zinc, manganese and magnesium is fully co-extracted with cobalt. No further removal of impurities from nickel is advised as such impurities are considered to be present at very low levels.

In conclusion, there is need for a simple and practical method by which high-purity nickel sulphate with low levels of cobalt, calcium, magnesium and other impurities are achieved and which results in nickel sulphate that can be used in high-purity-demanding applications such as electroless deposition of nickel metal layers or as precursor for battery cathode materials. It is an object of the present invention to provide a novel process for producing a high-purity nickel sulphate solution from an aqueous nickel solution comprising cobalt, magnesium and calcium and optionally impurities such as iron, zinc, copper, cadmium and manganese. Furthermore, it is an object of the present invention that nickel sulphate can easily be produced with a stable quality. Finally, it is an object of the present invention to provide a process which allows for the production of a cobalt-rich aqueous solution suitable for further processing out of crude nickel raw materials.

SUMMARY

The current invention provides in a solution for at least one of the abovementioned problems by providing a process for preparing a high-purity nickel sulphate solution, as described in claim 1.

The present invention has the advantage that the elements cobalt, zinc, manganese, cadmium, aluminium, copper, calcium, as well as magnesium, all if present, are completely separated from nickel. The invention consists of a two-step solvent-extraction process, where all mentioned impurities except for magnesium are removed completely in a first step, and residual magnesium is removed in a second step.

The overall process according to the invention is efficient in the sense that it provides a nickel solution of high purity, i.e. at least 99.8 at. % nickel relative to the metal content of said solution, while avoiding loss of materials thanks to minimal co-extraction of the matrix element that is nickel; this way avoiding the formation of complex nickel containing mixtures. As such, the process according to the present invention is environmentally friendly. The processing strategy is such that presence in the end solution of unwanted ions originating from used reagents during the nickel refining process in the nickel sulphate end solution, such as calcium from calcium bases, sodium from sodium bases and chlorides from hydrochloric acid is avoided. This way the nickel sulphate solution obtained from the presented process is easily further processed by crystallization or spray drying to form nickel sulphate crystals or granules, respectively, which are easily transported. Advantageously, the present invention also allows for the production of a cobalt-rich eluate, which can be further processed separately, e.g. for the production of high-purity cobalt salts as cobalt chloride, cobalt sulphate or other. The inventive process is simple, environmentally friendly and provides nickel sulphate of high purity.

DESCRIPTION OF THE FIGURES

By means of further guidance, FIGURES are included to better appreciate the teaching of the present invention. Said FIGURES are intended to assist the description of the invention and are nowhere intended as a limitation of the presently disclosed invention. The figures and symbols contained therein have the meaning as commonly understood by one of ordinary skill in the art to which this invention belongs.

FIG. 1 shows schematically a process according to the first aspect of the present invention.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows at least and do not exclude or preclude the presence of additional, non-recited components, features, elements, members or steps known in the art or disclosed therein.

The recitation of numerical ranges by endpoints includes all numbers and fractions subsumed within that range, as well as the recited endpoints. All percentages are to be understood as percentage by weight, abbreviated as "wt. %" or as volume percent, abbreviated as "vol. %" or as atomic percent, abbreviated as "at. %", unless otherwise defined or unless a different meaning is obvious to the person skilled in the art from its use and in the context wherein it is used.

Regarding the organic phase following terms are used to identify its components or the whole:

i. The "extractant" or extracting agent is the active component in the organic phase that extracts the metal species to the organic phase by chemically binding with it and forming a metal-extractant complex that is better soluble in the organic phase than it is in the aqueous phase.

ii. The "diluent" is an organic molecule or usually a mixture of different organic molecules added to the organic phase to dilute the extractant and allow for dissolution of the metal complexes, improve the physical properties of the organic phase (especially phase-separation phenomena) and decrease its cost, given that diluents are usually cheaper than extractants. Diluents are frequently kerosene fractions and can be aliphatic or aromatic hydrocarbons, naphthenes, etc., or mixtures thereof.

iii. The organic phase may also contain a "modifier". A modifier is sometimes added to improve solubility of metal complexes into the organic phase, to alter the physical properties of the solvent such to avoid crud formations or third-phase formation as these phenomena are unwanted in solvent extraction. A modifier can also be added to prevent chemical degradation of extractant or diluent. However, modifiers may impair the selectivity of the organic phase as these may participate in the complex formation of the metals with the extractant.

iv. The "organic phase" is another term used to identify the "solvent" or "solvent mixture" and comprises a mixture of extractant(s), diluent(s) and optionally modifier(s).

The "selectivity" S of an extractant for one metal over another metal can be expressed as the ratio of the distribution coefficients D for both metals:

$$S_{Mg/Ni} = D_{Mg}/D_{Ni}$$

The "distribution coefficient" of a metal is understood to be the ratio of the equilibrium concentrations of this metal in the organic phase and the same metal in the aqueous phase, respectively:

$$D_M = [M]_O/[M]_A$$

wherein M is a metal, such as nickel or magnesium, O refers to the organic phase and A refers to the aqueous phase.

In the context of the present invention, a "solvent extraction circuit" is to be understood as synonymous to the term "solvent extraction," "solvent extraction process", "solvent circuit", "solvent loop", or "solvent extraction loop," and refers to a series of one or multiple solvent extraction sections, each consisting of one or multiple solvent extraction stages. Whereas each extraction section can proceed with a different set of process parameters, such as temperature, pH profile, and solvent-water ratio, a solvent extraction circuit makes use of only one and the same organic phase. The organic phase composition of a solvent extraction circuit is fixed, as characterized by a single set of parameters like the type of extractant, the type of diluent, and the extractant-diluent ratio.

In a first aspect, the present invention provides a process for preparing a high-purity nickel sulphate solution, comprising the steps of:

i. providing an aqueous feed solution comprising nickel, cobalt, calcium and magnesium, and if present zinc, manganese, cadmium, and/or copper;

ii. extracting cobalt, calcium and, at least in part, magnesium from said aqueous feed solution using a first organic phase comprising a first alkylphosphorus-based extractant (I) and a first diluent, thereby obtaining an aqueous raffinate solution (A1) comprising nickel and a residual magnesium content and a cobalt-rich organic phase (O1), which organic phase typically comprises calcium, magnesium and nickel, and if present zinc, copper, cadmium and manganese; and iii. extracting magnesium from said aqueous raffinate solution (A1) using a second organic phase (O2) comprising a second alkylphosphorus-based extractant (II) and a second diluent, thereby obtaining a magnesium-depleted, high-purity aqueous nickel sulphate solution (A2) and a magnesium-enriched organic phase.

The present invention has the advantage that the elements cobalt, magnesium, calcium, and further zinc, manganese, cadmium, iron, aluminium, and copper, if present, are completely separated from nickel in one single process. The process affords a high-purity aqueous nickel sulphate solution comprising nickel with a concentration between 40 and 200 g/L and magnesium with a concentration of at most 10 mg/L (A2), two loaded organic phases, i.e. a cobalt-rich organic phase (O1) comprising calcium, magnesium and nickel, and if present zinc, copper, cadmium and manganese, and a magnesium-enriched organic phase comprising nickel and magnesium (O2). Preferably, said high-purity aqueous nickel sulphate solution comprises at most 5 mg/L magnesium, and even more preferably at most 1 mg/L. Said first and said second organic phase may comprise a modifier.

Said aqueous raffinate solution A1 comprises nickel sulphate together with magnesium in a concentration between 20 mg/L and 20 g/L, and preferably between 20 mg/L and 2 g/l, and more preferably between 20 mg/L and 500 mg/L.

Generally, the residual magnesium content in the obtained aqueous raffinate solution (A1) is too high for high-purity applications and is therefore subjected to a second solvent extraction step.

The solvent extraction steps ii. and iii. can be performed in any device suitable and are not specifically limited. Solvent extraction equipment generally includes at least one or more devices consisting of a mixer-settler, a column contactor, a centrifugal contactor or any other type of contactor. Preferably, the extraction is performed in a counter-current configuration.

Preferably, the present invention further provides a process according to the first aspect of the invention, further comprising step iv. whereby said cobalt-rich organic phase (O1) comprising calcium, magnesium and nickel, and if present zinc, copper, cadmium and manganese, is stripped with an aqueous solution comprising a mineral acid. This effectively results in the elution of cobalt, calcium, magnesium and if present zinc, copper, cadmium and manganese from said first solvent. Preferably, said mineral acid is one or more selected from the group comprising: hydrofluoric acid, hydrochloric acid, hydrobromic acid, hydroiodic acid, nitric acid, phosphoric acid, sulphuric acid, boric acid and perchloric acid. More preferably, said mineral acid is one or more selected from the group comprising: hydrochloric acid, hydrobromic acid, nitric acid, phosphoric acid and perchloric acid. In another embodiment, said mineral acid is sulphuric acid. Most preferably, said mineral acid is hydrochloric acid. This allows to obtain a concentrated eluate solution comprising cobalt, calcium, magnesium and if present zinc, copper, cadmium and manganese from said first solvent.

The stripping step can be performed in any device suitable and is not specifically limited. Stripping equipment generally includes at least one or more devices consisting of a mixer-settler, a column contactor, a centrifugal contactor or any other type of contactor. Preferably, the stripping is performed in a counter-current configuration.

In a preferred embodiment, the present invention provides a process according to the first aspect of the invention, whereby said aqueous feed solution comprising nickel, cobalt, calcium, magnesium and optionally zinc, copper, cadmium and manganese is obtained by removing iron and/or aluminium from a pregnant leach solution comprising nickel, cobalt, magnesium and iron and/or aluminium, and optionally calcium, zinc, copper, cadmium and manganese. Said iron and/or aluminium can advantageously be removed by adding a basic reagent such as a hydroxide or other to said aqueous solution, thereby forming an iron and/or aluminium hydroxide precipitate. Potentially, addition of an oxidant, like for example oxygen or hydrogen peroxide, might be included in that iron and/or aluminium removal step.

In a preferred embodiment, said iron and/or aluminium is removed by precipitation using a calcium base such as calcium hydroxide, calcium oxide, calcium carbonate, calcium bicarbonate or any other calcium-containing basic reagent. The use of a calcium base is advantageous since calcium forms calcium sulphate, also called gypsum, with low aqueous solubility in this step of the process. Hence, the use of excessive amounts of calcium base is not detrimental to the purity of the obtained nickel sulphate solution. Only a limited amount of calcium will remain into the nickel solution that is sent to the solvent extraction step ii. The latter process is designed such to enable complete removal of calcium from the nickel solution. The formation of calcium sulphate during precipitation of iron and/or aluminium enhances the filterability of the iron and/or aluminium precipitate. Hence, it may be preferred that the calcium base is used in a stoichiometric excess relative to the amount of iron and/or aluminium impurities present in said aqueous feed solution comprising nickel, cobalt, magnesium and iron and/or aluminium.

In another preferred embodiment, the employed base may be a hydroxide or carbonate of nickel or any other nickel-containing basic reagent, thereby introducing beneficial nickel ions in the nickel sulphate solution. Other preferred nickel bases are nickel bicarbonate and nickel hydroxy sulphate.

In yet another preferred embodiment, the employed base may be a hydroxide or carbonate of magnesium or any other magnesium-containing basic reagent, since magnesium is efficiently and effectively removed in the subsequent steps of the inventive process. Other preferred magnesium bases are magnesium bicarbonate and magnesium hydroxy sulphate.

In yet another preferred embodiment, impurities such as iron and/or aluminium may be separated by precipitation using a combination of two or more precipitation agents selected from calcium base, magnesium base and nickel base.

Furthermore, impurities such as iron and/or aluminium may be removed by precipitation in two or more precipitation steps, whereby a different precipitating agent may be used in each precipitation step. In a preferred embodiment, a nickel base is used in a first precipitation step, and a calcium base is used in a subsequent precipitation step.

Alternatively, impurities such as iron and/or aluminium may be separated by other methods such as neutralization. However, the use of alkali bases, such as sodium hydroxide or potassium hydroxide, will introduce metal impurities into the aqueous feed solution that are not extractable by the subsequent solvent extraction processes, and thus, might complicate a potential crystallization or granulation process at the end of the flowsheet.

In another embodiment, calcium is already present into the nickel feed solution entering the solvent extraction step ii, because it was introduced by raw materials upfront or by using a calcium containing reagent, such as a calcium base as calcium hydroxide, calcium oxide, calcium carbonate, calcium bicarbonate or another Ca containing basic reagent before entering the solvent extraction step ii.

In a preferred embodiment, the present invention provides a process according to the first aspect of the invention, whereby said aqueous feed solution provided in step i. comprises nickel in an amount of at least 60 at. %, relative to the total metal content of said aqueous feed solution, and cobalt in an amount of at most 40 at. %, relative to the total metal content of said aqueous feed solution. Preferably, said aqueous feed solution comprises nickel in an amount of at least 70 at. %, and cobalt in an amount of at most 30 at. %, more preferably, said aqueous feed solution comprises nickel in an amount of at least 80 at. % and cobalt in an amount of at most 20 at. %, and most preferably said aqueous feed solution comprises nickel in an amount of at least 90 at. % and cobalt in an amount of at most 10 at. %.

In a preferred embodiment, the present invention provides a process according to the first aspect of the invention, whereby said aqueous feed solution provided in step i. further comprises calcium, magnesium, zinc, copper, cadmium and manganese in a totalized amount of at most 25 at. %, relative to the total metal content of said aqueous feed solution. Preferably, said aqueous feed solution further comprises calcium, magnesium, zinc, copper, cadmium and manganese in a totalized amount of at most 10 at. % and even more preferably in an amount of at most 5 at. %.

Hereby, the aqueous feed solution can originate from all kinds of resources like mixed hydroxide precipitates, crude nickel sulphate or any other type of suitable resource which is suitable as such or which has optionally been processed into a suitable feed solution. This processing can include leaching, selective leaching, dissolving, precipitation steps and/or any other type of pre-treatment step. Combinations hereof are possible. For example, a pre-processed battery recycling material containing nickel, cobalt, manganese and lithium can be treated in this flowsheet to produce a pure nickel sulphate solution if at least leaching and eventually upfront lithium removal is included in the pre-processing. Alternatively, lithium is removed at the end of step iii. by means of for example lithium ion-exchange columns.

In a preferred embodiment, the present invention provides a process according to the first aspect of the invention, whereby said extractants used in steps ii. and iii. comprise alkylphosphorus-based acids. Suitable alkylphosphorus-based acids include bis(2-ethylhexyl) phosphoric acid (D2EHPA), (2-ethylhexyl) phosphonic acid mono(2-ethyl-hexyl) ester (EHEHPA, PC88A), bis-(2,4,4-trimethylpentyl) phosphinic acid (CYANEX272 or IONQUEST 290) and diisooctylphosphinic acid (DOPA). Alkylphosphorus-based acids act as chelating extractants due to the presence of coordinative phosphorus and oxygen atoms in these molecules. Among the elements in the aqueous solution, an element that forms the corresponding chelate compound with a higher stability facilitates the extraction efficiency more compared to an element that is less likely to form the chelate compound.

When EHEHPA (PC88A) is used as the extractant, the extraction behaviour of magnesium and calcium is similar to that of nickel. Hence, when a solution containing nickel at high concentration is submitted to solvent extraction, the problem occurs that the extraction efficiency of magnesium and calcium is decreased. The present invention solves the problem of insufficient calcium extraction by choosing operating conditions that favour calcium extraction but decrease magnesium extraction at the same time. The latter is offset by implementing an additional and separate solvent extraction for magnesium with a more favourable second extractant and operating conditions more favourable for the extraction of magnesium.

In a preferred embodiment, the present invention provides a process according to the first aspect of the invention, whereby said second extractant (II) has a higher selectivity for magnesium than said first extractant (I). In other words, said second extractant (II) has an affinity for magnesium higher than the affinity of said first extractant (I). Moreover, said second extractant (II) has a higher selectivity for magnesium than for nickel. Most preferably, the second extractant (II) comprises an alkylphosphinic acid such as IONQUEST 290.

In a preferred embodiment, the present invention provides a process according to the first aspect of the invention, whereby said first extractant (I) has a higher selectivity for calcium over nickel than said second extractant (II). In other words, said first extractant (I) has an affinity for calcium higher compared to nickel than the affinity of said second extractant (II) has for calcium over nickel. Moreover, said first extractant (I) has a higher selectivity for calcium than for nickel. Most preferably, the first extractant (I) comprises an alkylphosphonic acid such as PC88A. Preferably, said first alkylphosphorus-based extractant (I) comprises an alkylphosphonic acid and/or nickel salts thereof, and said second alkylphosphorus-based extractant (II) comprises an alkylphosphinic acid and/or nickel salts thereof.

In a preferred embodiment, the present invention provides a process according to the first aspect of the invention, whereby said first and said second diluent is a hydrocarbon. More generally, any organic, water-immiscible solvent capable of dissolving the extractant can be used. Hence, the diluent is not specifically limited. As diluent examples, kerosene-based compounds, which can be aliphatic, naphthenic, aromatic or even mixtures thereof, can be used.

In a preferred embodiment, the present invention provides a process according to the first aspect of the invention, whereby said first organic phase used in step ii. comprises said first extractant (I) in an amount of 5 to 50 vol. %, relative to the total volume of said first organic phase, and said first diluent in an amount of 50 to 95 vol. %, relative to the total volume of said first organic phase. More preferably, said first organic phase comprises said first extractant (I) in an amount of 30 to 40 vol. %, and said first diluent in an amount of 60 to 70 vol. %.

In a preferred embodiment, the present invention provides a process according to the first aspect of the invention, whereby said second organic phase used in step iii. comprises said second extractant (II) in an amount of 5 to 50 vol. %, relative to the total volume of said second organic phase, and said second diluent in an amount of 50 to 95 vol. %, relative to the total volume of said second organic phase. More preferably, said second organic phase comprises said second extractant (II) in an amount of 10 to 25 vol. %, and said diluent in an amount of 75 to 90 vol. %. It was found that the extractant concentration in the organic phase allowed for an optimal extraction of magnesium without loss of processability of the solvent.

In a preferred embodiment, said extractants used in steps ii. and iii. are neutralized with an alkali metal hydroxide and preloaded with nickel at a high pH, prior to use for extraction in steps ii. and iii, where the nickel-preloaded organic phase is brought into contact with the aqueous feed solution containing impurities. In such case, an exchange reaction occurs by which elements that are more likely to be extracted than nickel are transferred to the solvent, whereas nickel in the organic phase is transferred to the aqueous phase. As a result, impurities are removed from the aqueous feed solution while increasing the nickel concentration in the resulting raffinate solution, hence largely avoiding introduction of the alkali metal from the neutralizing agent to the main process (raffinate) stream. As alkali metal hydroxide can be used sodium hydroxide, potassium hydroxide, ammonium hydroxide or the like. Yet, preferably, sodium hydroxide is used as an alkali metal hydroxide.

It was found that preloading of said extractants used in steps ii. and iii. with nickel allowed for an optimal and improved extraction without loss of processability of the extractant. During this preloading step, the partially neutralized extractant, i.e. being in the alkali-metal-converted form, exchanges the alkali metal, typically sodium, on the extractant for nickel from an aqueous nickel sulphate solution. Preferably, the residual amount of alkali metal on the preloaded solvent is as low as possible, so to limit transfer of residual alkali metal from the preloaded solvent to the aqueous feed solution when extracting impurities from this solution.

Part of nickel may be replaced by another harmless metal that will exchange with the impurities to be extracted from the aqueous nickel sulphate solution to be purified. This could be an alkali metal such as sodium or potassium, a similar species like ammonium. However, these other metals may impart the extraction of such metals present in the aqueous nickel sulphate solution to be purified, or even contaminate the nickel sulphate solution by exchanging with impurities to be extracted.

In a preferred embodiment, the present invention provides a process according to the first aspect of the invention, whereby, prior to extraction, said extractants are converted to their nickel salts corresponding to an appropriate conversion of the extractant, hence comprising nickel in an amount between 20 and 70% of the available extractant capacity and residual sodium accounting to a concentration of 2 g/L at most, preferably at most 0.5 g/L, and more preferably at most 0.1 g/L. Preferably, nickel is preloaded to an amount between 25 and 60% of the available extractant capacity, preferably more than 30% of the available extractant capacity, and residual sodium accounting to a concentration of 0.5 g/L at most. More preferably, nickel is preloaded to an amount between 30 and 50% of the available extractant capacity and residual sodium accounting to a concentration of 0.1 g/L at most.

The preferred nickel concentration on the preloaded solvent thus depends on the extractant concentration and the conversion degree. Both are determined by the target pH in the aqueous feed solution, and so, are function of the total amount of impurities to be removed. A higher conversion degree of the extractant results in a higher pH during extraction, allowing for a higher extraction of impurities (and nickel) from the nickel-containing feed solution, whereas a lower conversion degree of the extractant results in a lower pH during extraction, allowing for a better selectivity for the impurities towards nickel.

In a preferred embodiment, the preloaded solvent containing nickel and possibly some other metals such as sodium, potassium or other ones, or other cations such as ammonium, may be contacted again with a pure nickel-containing solution, such as a nickel sulphate or a nickel chloride solution, in order to further exchange the metals sodium, potassium, ammonium or other ones on the solvent with nickel from the pure nickel-containing solution. The nickel-preloading operation can be performed in two or more stages, preferably in counter-current operation, with at least a pure nickel sulphate solution, so to scrub possibly co-extracted alkali metals from the used base off from the solvent. As a result, a nickel-preloaded solvent containing significantly fewer other metals is obtained that can be used in extraction steps ii. and iii., this way maximally avoiding contamination of the aqueous nickel solution with unwanted metals.

In a preferred embodiment, the present invention provides a process according to the first aspect of the invention, whereby said aqueous feed solution entering step ii. has a pH between 1.0 and 6.0 before being contacted with said solvents comprising extractant I, generating a chemical equilibrium between the aqueous nickel solution and the solvent, more preferably at a pH between 2.0 and 5.5, and most preferably at a pH between 3.0 and 5.0.

In a preferred embodiment, the present invention provides a process according to the first aspect of the invention, whereby said extraction in step ii. is performed at a temperature between 25 and 70° C., preferably between 3° and 60° C., more preferably between 3° and 55° C., or even between 3° and 50° C. More preferably, said extraction in step ii. is performed at a temperature between 35 and 45° C. The inventors have found that the extraction of calcium from the nickel solution improves at lower temperatures. Therefore, it is preferred that the extraction temperature of step ii. is lower than 50° C., and preferably lower than 45° C. However, at lower temperatures, the efficiency of cobalt extraction is reduced. Therefore, it is preferred that an extraction temperature of above 25° C., preferably above 30° C., and more preferably above 35° C. is used. Thus, most preferably, the extraction temperature in step ii. is higher than 25° C. and lower than 45° C., preferably higher than 30° C. and lower than 45° C., and more preferably higher than 35° C. and lower than 45° C. Specifically, said extraction temperature is 36° C., 38° C., 40° C., 42° C. or 44° C., or any temperature there in between.

In a preferred embodiment, the present invention provides a process according to the first aspect of the invention, whereby said aqueous raffinate solution resulting from step ii. and entering step iii. has a pH between 2.0 and 7.0 before being contacted with said second solvent comprising extractant II, generating a chemical equilibrium between the aqueous nickel solution and the second solvent, more preferably at a pH between 3.0 and 6.5, and most preferably at a pH between 4.0 and 6.0.

In a preferred embodiment, the present invention provides a process according to the first aspect of the invention, whereby said extraction in step iii. is performed at a temperature of at least 25° C., at least 30° C., preferably at least 35° C., and at most 80° C. Preferably, said extraction in step iii. is performed at a temperature between 4° and 70° C., or even between 45° C. and 65° C. More preferably, said extraction in step iii. is performed at a temperature between 5° and 60° C. The inventors have found that the extraction of magnesium from the nickel solution improves with higher extraction temperatures. Nevertheless, it is preferred that the extraction temperature is limited to below 80° C., below 70° C. or below 65° C. for reasons of processability of the organic solvent and safety related aspects of the organic solvent.

In a preferred embodiment, the present invention provides a process according to the first aspect of the invention, whereby said extraction in step iii. is performed at a temperature higher than the temperature of said extraction in step ii. Preferably, the temperature in step iii. is at least 5° C. higher than the temperature in step ii., more preferably at least 10° C. higher and more preferably 10° C. to 20° C. higher, and most preferably about 15° C. higher.

In a preferred embodiment, the present invention provides a process according to the first aspect of the invention, whereby said aqueous high-purity nickel sulphate solution obtained after step iii. is subjected to crystallization or granulation. Preferably, nickel sulphate in said nickel sulphate solution is crystallized, thereby allowing for an additional purification step. In case of granulation, any granulation technique known to the skilled person is suitable, such as e.g. spray drying.

In a preferred embodiment, the present invention provides a process according to the first aspect of the invention, whereby nickel is scrubbed from said cobalt-rich organic phase and/or from said magnesium-enriched organic phase. To recover this co-extracted nickel from the loaded organic phases before going to the impurity stripping, it is first scrubbed selectively from these solvents by washing with an acidic solution, such as a sulphuric acid solution in water. Nickel is selectively scrubbed by applying optimal conditions of pH, specifically the acidity of the final scrub solution, and the added amount of acid is adapted to reach this required pH.

In a preferred embodiment, the present invention provides a process according to the first aspect of the invention, whereby said stripping step in step iv. is performed with hydrochloric acid. Said stripping step allows for eluting nickel with cobalt, calcium, magnesium and if present zinc, copper, cadmium, and manganese from said first loaded solvent (O1). As such, the extractant is regenerated to yield a metal-free solvent that can be reused for extraction or preloading. Given the presence of calcium in the obtained stripping solution, the use of hydrochloric acid is preferred. By stripping with hydrochloric acid, calcium chloride is formed which is readily water soluble. This way, the metal content can be concentrated from solvent to aqueous solution. Given the low solubility of calcium sulphate, the use of sulphuric acid could induce the formation of a solid precipitate disrupting the solvent extraction processing.

In a preferred embodiment, said hydrochloric acid solution has a concentration of at least 50 g/L, and more preferably a concentration between 100 g/L and 300 g/L.

In a preferred embodiment, said stripping in step iv. is performed at a temperature between 40° C. and 55° C., preferably between 40° C. and 50° C., and more preferably at a temperature of about 45° C.

In a preferred embodiment, the present invention provides a post-treatment step according to the first aspect of the invention, whereby said magnesium-depleted, high-purity aqueous nickel sulphate solution comprises nickel in a concentration of 40 to 180 g/L, and magnesium in a concentration of at most 5 mg/L, preferably at most 1 mg/L. Preferably, said high-purity aqueous nickel sulphate solution has the content of calcium, cobalt, iron, aluminium, zinc, manganese and/or cadmium, each individually in an amount of at most 15 mg/L, preferably in an amount of at most 10 mg/L, or even at most 5 mg/L.

In a preferred embodiment, the present invention provides a post-treatment step according to the first aspect of the invention, whereby said cobalt-enriched organic phase, after stripping with hydrochloric acid in step iv., is additionally washed with sulphuric acid. Preferably, said solvent is washed with sulphuric acid comprised in an aqueous solution with a concentration of 10 to 200 g/L. Washing with sulphuric acid allows for the removal of chloride ions and possibly residual metals, such as iron or aluminium, from the solvent. As such, the solvent is regenerated and can be reused for extraction after it is preloaded.

In a preferred embodiment, the present invention provides a stripping of the second solvent containing magnesium and nickel with sulphuric acid. Preferably, said solvent is washed with sulphuric acid comprised in an aqueous solution with a concentration of 10 to 200 g/L. Washing with sulphuric acid allows also for the removal of possibly residual metals, such as iron or aluminium, from the solvent. As such, the solvent is regenerated and can be reused for extraction after it is preloaded.

EXAMPLES

For each process step an example is given to further clarify the present invention. These examples are based on experimentally derived data and nowhere intended to limit the scope of the present invention.

Preparation of the Aqueous Feed Solution

An aqueous leachate solution is obtained from leaching a crude $NiSO_4$ raw material.

This leachate solution is subjected to a de-ironing operation by neutralization with $Ni(OH)_2$ followed by $Ca(OH)_2$ in a subsequent step. A solid iron cake is formed which is filtrated and separated from the aqueous solution. The compositions of the aqueous nickel sulphate solution before and after this two-step de-ironing operation are presented in the table below. The resulting aqueous feed solution comprising nickel, cobalt, calcium, magnesium, copper, zinc and manganese is devoid of iron and aluminium and proceeds to the solvent extraction installation.

| De-ironing | Ni (g/L) | Co (g/L) | Ca (g/L) | Mg (g/L) | Cu (g/L) | Fe (g/L) | Al (g/L) | Zn (g/L) | Mn (g/L) | Na (g/L) |
|---|---|---|---|---|---|---|---|---|---|---|
| Before | 130 | 2.81 | 0.610 | 1.93 | 0.221 | 0.964 | 0.163 | 0.769 | 0.202 | 0.453 |
| After | 120 | 2.58 | 0.610 | 1.75 | 0.170 | 0.000 | 0.000 | 0.710 | 0.187 | 0.406 |

Preparation of Nickel-Preloaded Extractant I

The first solvent is prepared by combining (2-ethylhexyl) phosphonic acid mono(2-ethylhexyl) ester (PC88A) and a hydrocarbon diluent, Escaid 110 (ExxonMobil). The first solvent is composed of 36 vol % PC88A and 64 vol % hydrocarbon diluent. In two consecutive steps, the solvent is contacted with a high-purity aqueous nickel sulphate solution containing 125 g/L nickel and 1.0 g/L sodium. A 125 g/L NaOH solution is added into a mixer-settler, in such a volume that a preloaded solvent containing 11 g/L nickel is targeted. This corresponds to a conversion degree of 36% of the total extractant capacity. After one preloading step, the solvent contains 10.4 g/L nickel and 0.82 g/L sodium. After the second preloading step, a solvent containing 10.8 g/L nickel and a residual sodium concentration of 0.12 g/L is obtained.

Extraction of Cobalt, Calcium and Other Impurities

The aqueous feed solution is mixed in several stages with the first solvent comprising PC88A, preloaded to 9.1 g/L nickel, to extract cobalt, calcium, zinc, copper, manganese and part of magnesium at a temperature of 40° C. The extraction section consists of four consecutive mixer-settlers. A first loaded solvent containing nickel, cobalt, calcium, magnesium, copper, zinc, manganese and cadmium (O1) and an aqueous raffinate solution comprising nickel sulphate together with a significant residual amount of magnesium (A1) are obtained in addition to sodium having a concentration below 1 g/L. Compositions of feed solution and raffinate are presented in the table below. The nickel concentration in the aqueous raffinate increases compared to the nickel concentration in the aqueous feed solution because nickel on the preloaded solvent was stoichiometrically exchanged for impurities from the feed solution during extraction.

|  | Ni (g/L) | Co (mg/L) | Ca (mg/L) | Mg (mg/L) | Cu (mg/L) | Zn (mg/L) | Mn (mg/L) | Cd (mg/L) | Na (g/L) |
|---|---|---|---|---|---|---|---|---|---|
| Feed solution | 131 | 240 | 600 | 300 | 15 | 330 | 10 | 4 | 0.58 |
| Raffinate | 136 | 1 | 5 | 160 | <1 | <1 | <1 | <1 | 0.92 |

Stripping of Extractant I with Hydrochloric Acid

After extraction, the first loaded solvent containing sodium, nickel, cobalt, calcium, magnesium, zinc, cadmium and manganese is treated with an aqueous solution composed of hydrochloric acid with a concentration of 200 g/L and at a temperature of 43° C. The elution section consists of multi-stage mixer-settler set-up. The solvent is regenerated and an aqueous eluate with 35 g/L residual hydrochloric acid is produced. Compositions of loaded and stripped solvent are presented in the table below.

|  | Ni (g/L) | Co (g/L) | Ca (g/L) | Mg (g/L) | Zn (g/L) | Mn (g/L) | Cd (g/L) | Na (mg/L) |
|---|---|---|---|---|---|---|---|---|
| Loaded solvent | 1.60 | 2.30 | 0.88 | 2.90 | 1.60 | 0.22 | 0.014 | 3 |
| Stripped solvent | 0.001 | <0.001 | 0.002 | <0.001 | 0.005 | <0.001 | <0.001 | <1 |

Washing of First Solvent with Sulphuric Acid

After the elution section the first solvent can be washed with an aqueous solution composed of sulphuric acid. The most important goal of this aftertreatment of the stripped solvent is to remove entrained hydrochloric acid from the preceding elution section. Therefore, the stripped solvent is contacted with a sulphuric acid (33 g/L) solution. As a result, all residual contaminants are removed from the stripped solvent; Ni, Co, Ca, Mg, Zn, Mn, Cd, Na and Cl all <1 mg/L. Hence, it can be regenerated for a next cycle.

Scrubbing of Extractant I with Sulphuric Acid

After extraction and prior to stripping, an additional scrubbing step may be opted for to avoid loss of nickel to the eluate. The first loaded solvent containing sodium, nickel, cobalt, calcium, magnesium, zinc and manganese is combined with an aqueous solution composed of sulphuric acid with a concentration of 500 g/L. The experiment is performed at a temperature of 40° C. The scrubbing section consists of three consecutive mixer-settlers. Compositions of the solvent before and after scrubbing are presented in the table below. A high selectivity is obtained: whereas nickel is scrubbed with a yield of 91% and Mg is scrubbed for 13%, all other impurities remain on the solvent.

| | Ni (g/L) | Co (g/L) | Ca (g/L) | Mg (g/L) | Zn (g/L) | Mn (g/L) | Cu (g/L) |
|---|---|---|---|---|---|---|---|
| Loaded solvent | 3.5 | 1.4 | 2.5 | 0.15 | 1.7 | 0.037 | 0.61 |
| Scrubbed solvent | 0.30 | 1.4 | 2.5 | 0.13 | 1.7 | 0.037 | 0.61 |

Preparation of Nickel-Preloaded Extractant II

The second solvent is prepared by combining bis-(2,4,4-trimethylpentyl) phosphinic acid (IONQUEST 290) and Escaid 110 (ExxonMobil), a hydrocarbon diluent. The second solvent is composed of 15 vol % IONQUEST 290 and 85 vol % Escaid 110. In two consecutive steps in a counter-current configuration, the solvent is contacted with a high-purity aqueous nickel sulphate solution containing 130 g/L nickel and 0.90 g/L sodium. A 125 g/L NaOH solution is used such that a preloaded solvent containing around 5.0 g/L nickel is obtained. This corresponds to a conversion degree of 38% of the total extractant capacity. After one preloading step, the solvent contains 2.2 g/L nickel and 79 mg/L sodium. After the second preloading step, a solvent containing 4.6 g/L nickel and a residual sodium concentration of 67 mg/L is obtained. More or less nickel or residual sodium on the preloaded solvent is possible, depending on the exact conditions.

In another example, higher extractant concentrations are applied. The second solvent, comprising IONQUEST 290 and Escaid 110, is contacted in one step with a high-purity aqueous nickel sulphate solution containing 97 g/L nickel, 40 mg/L magnesium and 27 mg/L sodium at a temperature of 55° C. pH is kept constant at a value of 6.0 with a 125 g/L NaOH solution. The amount of nickel loaded on the solvent as a function of the extractant concentration is given in in the table below.

| Ionquest 290 concentration (vol %) | Nickel loaded on solvent (g/L) |
|---|---|
| 10 | 3.2 |
| 15 | 4.1 |
| 20 | 5.1 |
| 25 | 7.5 |
| 30 | 8.9 |
| 35 | 10.3 |

Extraction of Magnesium to Form a High-Purity Nickel Sulphate Solution

Aqueous raffinate obtained after the first solvent extraction (A1), containing 127 g/L nickel and 690 mg/L magnesium, is mixed with the second solvent comprising IONQUEST 290, preloaded to 6.0 g/L nickel, to extract the residual part of magnesium at a temperature of 55° C. The extraction section consists of five mixer-settlers in a counter-current configuration. What leaves the solvent extraction installation is (i) a second loaded solvent containing nickel and magnesium (O2), and (ii) an aqueous high-purity nickel sulphate solution containing only 1.0 mg/L magnesium (A2), hence which can proceed to a crystallization or granulation operation to obtain a high-purity nickel sulphate product. The nickel concentration in the aqueous raffinate increased to 138 g/L because nickel on the preloaded solvent was stoichiometrically exchanged for impurities from the feed solution during extraction.

Scrubbing of Extractant II with Sulphuric Acid

After extraction and prior to elution, an additional scrubbing step may be opted for to avoid loss of nickel to the eluate. The second loaded solvent containing 1.10 g/L nickel and 1.30 g/L magnesium is combined with an aqueous solution composed of sulphuric acid with a concentration of 70 g/L. The experiment is performed at a temperature of 40° C. The scrubbing section consists of three consecutive mixer-settlers. With the nickel concentration decreasing to 0.003 g/L nickel on the scrubbed solvent, a scrubbing yield of 99.7% is obtained. During this scrubbing operation no magnesium is co-scrubbed, yielding a scrubbed solvent with 1.30 g/L magnesium.

Effect of Temperature on Extraction of Different Impurities

In this example the effect of temperature on extraction of calcium, cobalt and magnesium is shown. The first solvent, comprising 35 vol % PC88A and 65 vol % Escaid 110, preloaded with 17 g/L nickel, is contacted in two consecutive steps with an aqueous feed solution containing 118 g/L nickel, 9 mg/L calcium, 68 mg/L cobalt and 124 mg/L magnesium. The extraction percentages at 25° C. and 65° C. are given for the different impurities in the table below. Whereas a lower temperature favours the extraction of calcium, a higher temperature favours the extraction of cobalt and magnesium.

| Extraction percentages | Co (%) | Ca (%) | Mg (%) |
|---|---|---|---|
| 25° C. | 54.3 | 34.5 | 7.3 |
| 65° C. | 83.8 | 24.9 | 34.1 |

Thus, the experimental results show that the extraction of calcium from the nickel solution improves at lower extraction temperatures. Therefore, it is preferred that the extraction temperature in this step is lower than 50° C., and preferably lower than 45° C. However, at lower extraction temperatures, the efficiency of cobalt extraction is also reduced. Therefore, it is preferred that an extraction temperature of above 25° C., preferably above 30° C., and more preferably above 35° C. is used. Most preferably, the extraction temperature is higher than 25° C. and lower than 45° C., preferably higher than 30° C. and lower than 45° C., and more preferably higher than 35° C. and lower than 45° C.

In another example the effect of temperature on extraction of magnesium is shown. The second solvent, comprising 15 vol % IONQUEST 290 and 85 vol % Escaid 110 is contacted in one step with an aqueous feed solution containing 127 g/L nickel and 180 mg/L magnesium. pH is controlled at pH=5.0. In the table below, it is shown that extraction percentages for magnesium increase from 25° C. over 44° C. to 65° C., whereas extraction of nickel remains low. As a result, the selectivity for magnesium over nickel increases with higher temperature.

| Extraction percentages | Mg (%) | Ni (%) | Selectivity Mg/Ni |
| --- | --- | --- | --- |
| 25° C. | 16.7 | 0.3 | 56 |
| 44° C. | 38.9 | 0.3 | 160 |
| 65° C. | 56.1 | 0.3 | 377 |

From the experimental results in the table above, it is clear that the extraction of magnesium from the nickel solution improves with higher extraction temperatures, i.e., an extraction temperature of at least 25° C., preferably at least 30° C., or even at least 35° C. More preferably, said extraction temperature is higher than 40° C., higher than 50° C., higher than 55° C., or even higher than 60° C. Nevertheless, it is preferred that the extraction temperature is limited to below 80° C., below 70° C. or below 65° C. for reasons of processability of the organic solvent, safety related aspects of the organic solvent and avoiding the need for high energy input.

The invention claimed is:

1. A process for preparing a high-purity nickel sulphate solution, comprising the steps of:
   i. providing an aqueous feed solution comprising nickel, cobalt, calcium, and magnesium, and if present, zinc, manganese, cadmium, and/or copper;
   ii. in a first solvent extraction circuit, extracting cobalt, calcium and, at least in part, magnesium, and if present, zinc, copper, cadmium, and manganese, from said aqueous feed solution using a first organic phase comprising a first alkylphosphorus extractant (I) and a first diluent, thereby obtaining an aqueous raffinate solution comprising nickel and a residual magnesium content and a cobalt-rich and calcium containing organic phase;
   iii. in a second solvent extraction circuit, extracting the residual magnesium content from said aqueous raffinate solution using a second organic phase comprising a second alkylphosphorus extractant (H), different from said first alkylphosphorous extractant (I), and a second diluent, thereby obtaining an aqueous nickel sulphate solution having reduced magnesium content relative to the aqueous raffinate solution and a magnesium-enriched organic phase; and
   iv. stripping said cobalt-rich organic phase obtained in step ii. with an aqueous solution comprising a mineral acid,
wherein said first alkylphosphorus extractant (I) and said second alkylphosphorous extractant (II) comprise nickel, and
   whereby said first organic phase and said second organic phase provided in steps ii. and iii. comprise said first and said second alkylphosphorus extractant, respectively, in an amount of 5 to 50 vol. %, relative to the total volume of said organic phases, and said diluents in an amount of 50 to 95 vol. %, relative to the total volume of said organic phases.

2. The process according to claim 1, whereby said mineral acid is hydrochloric acid.

3. The process according to claim 1, whereby said aqueous feed solution further comprises zinc, copper, cadmium, and/or manganese.

4. The process according to claim 1, whereby nickel is scrubbed from said cobalt-rich organic phase and/or from said magnesium-enriched organic phase.

5. The process according to claim 1, whereby said aqueous feed solution is obtained by removing iron and/or aluminium from an aqueous feed solution comprising nickel, cobalt, calcium, magnesium, sulphate, and if present zinc, copper, cadmium and/or manganese, and further comprising iron and/or aluminium, respectively.

6. The process according to claim 5, whereby said iron and/or aluminium is removed by precipitation using a precipitating agent, said precipitating agent comprising a calcium base.

7. The process according to claim 5, whereby said iron and/or aluminium is removed by precipitation using a precipitating agent, said precipitating agent comprising a magnesium base.

8. The process according to claim 5, whereby said iron and/or aluminium is removed by precipitation using a precipitating agent, said precipitating agent comprising a nickel base.

9. The process according to claim 5, whereby said iron and/or aluminium is removed by precipitation in two or more precipitation steps, whereby a different precipitating agent or a combination of precipitating agents may be used in each precipitation step.

10. The process according to claim 1, whereby said second alkylphosphorus extractant (II) has a higher selectivity for magnesium than said first alkylphosphorus extractant (I).

11. The process according to claim 1, whereby said first and said second alkylphosphorus extractants are converted to their nickel salts, containing nickel with a concentration of at least 20% of the available extractant capacity.

12. The process according to claim 11, whereby said first and said second alkylphosphorus extractants are converted to their nickel salts and neutralized with sodium hydroxide, and whereby said first and said second organic phases comprise less than 2 g/L sodium.

13. The process according to claim 1, whereby extracting cobalt, calcium, and, at least in part, magnesium, and if present, zinc, copper, cadmium, and manganese, in step ii. is performed at a temperature between 25 and 55° C.

14. The process according to claim 1, whereby extracting the residual magnesium content from said aqueous raffinate solution in step iii. is performed at a temperature between 40 and 70° C.

15. The process according to claim 1, whereby said stripping step iv. is performed at a temperature between 40° C. and 50° C.

16. The process according to claim 1, whereby said magnesium-depleted, high-purity aqueous nickel sulphate solution comprises nickel in a concentration of 40 to 180 g/L and magnesium in a concentration of at most 5 mg/L.

17. The process according to claim 1, whereby said aqueous feed solution provided in step i. comprises nickel in an amount of at least 60 at % relative to the total metal content of said aqueous feed solution, and whereby said aqueous feed solution provided in step i. comprises cobalt, calcium, magnesium, and optionally zinc, copper, cadmium, and manganese in an amount of at most 40 at % relative to the total metal content of said aqueous feed solution.

18. The process according to claim 1, whereby said high-purity aqueous nickel sulphate solution obtained after removal of residual magnesium in step iii. is subjected to crystallization or granulation.

19. The process according to claim 1, whereby said first organic phase, after stripping with said mineral acid, is washed with sulphuric acid.

20. The process according to claim 1, whereby said first and/or second organic phases, after washing or stripping with sulphuric acid, are loaded with nickel using an alkali hydroxide and a nickel salt-containing solution, and subsequently recycled in step ii. and/or step iii., this way closing the loop of the process.

* * * * *